Aug. 11, 1964   D. J. SHOWALTER, SR   3,143,827
CANOPY ASSEMBLIES
Filed April 15, 1960   2 Sheets-Sheet 1

INVENTOR
DENNIS J. SHOWALTER, SR.
Jacobi y Jacobi
ATTORNEYS

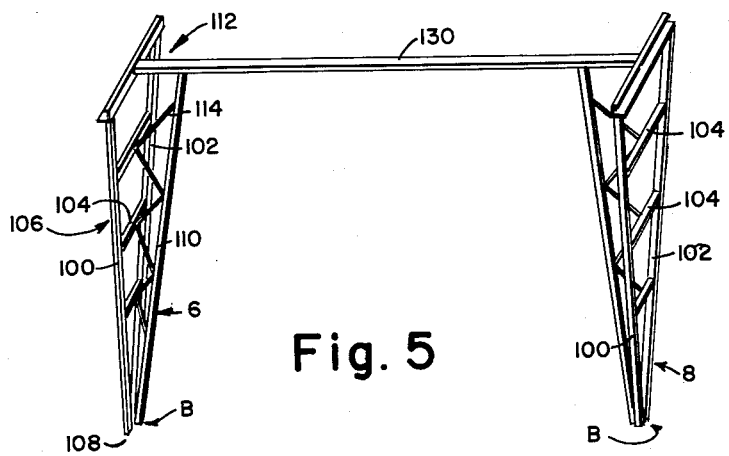
Fig. 5
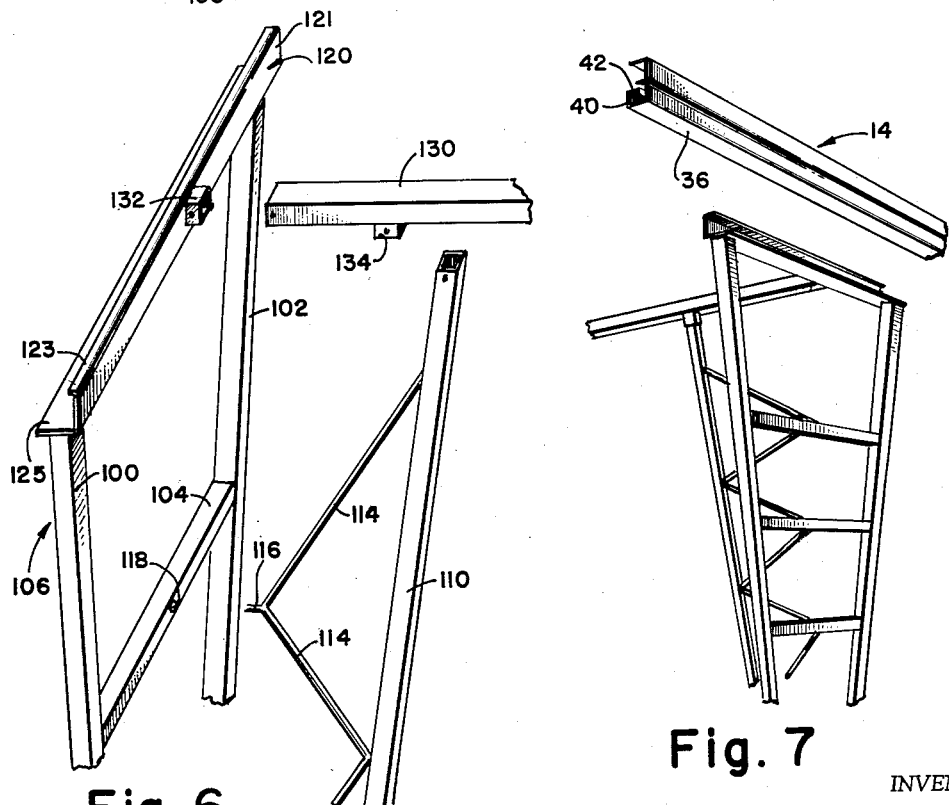
Fig. 6
Fig. 7
INVENTOR
DENNIS J. SHOWALTER, SR.
BY Jacobi + Jacobi
ATTORNEYS 3,143,827
CANOPY ASSEMBLIES
Dennis J. Showalter, Sr., 1000 Winter St., Jackson, Miss.
Filed Apr. 15, 1960, Ser. No. 22,571
4 Claims. (Cl. 50—67)

This invention relates to canopy assemblies, and more particularly to a versatile type of knock-down canopy assembly adapted to serve as a carport, patio, marquee, or the like.

The present invention constitutes an improvement over the various types of canopy assemblies heretofore proposed in that it provides a strong, durable, and attractive assembly, while at the same time minimizing the number of parts which must be coupled together by the purchaser who usually has no special skill or special tools to rely upon.

Particular primary objects of the present invention are: (a) to provide a canopy assembly which knocks down into small sections adapted for compact storage in a small space, and accordingly adapted to be shipped in knocked-down form; (b) to provide a canopy assembly which can be used as a porch cover, as a boat port, as a carport, as a marquee, as a walkway cover, as a patio cover, as a roof construction for a utility house, or for various other purposes; and (c) to provide a canopy assembly in accordance with the preceding objects which, by virtue of its construction, provides for draining of precipitation from the roof portion thereof at desired locations.

In addition to the primary general objects of the invention set forth above, a specific object of the present invention is to provide a canopy assembly which includes a plurality of joined roof sections and a frame surrounding and supporting the roof sections in such a manner that the frame serves as a facia for the roof, as well as a means for draining precipitation from the roof to a desired location.

Still another specific object of the present invention is to provide a canopy assembly conforming with the preceding objects wherein the roof portion of the assembly comprises a plurality of elongated roof sections which are easily joined together at their adjacent edges, and wherein the frame which surrounds and supports the roof portion is made up of a plurality of channeled members coupled together at the ends thereof by corner members adapted to receive the channeled members and hold the channeled members in position.

Still another, and more specific object of the present invention is to provide a canopy assembly as described above, wherein the channeled members which make up the frame are received by angled brackets carried at the top of leg members used to support the frame and thereby the roof portion of the assembly in spaced relation to the ground.

Yet other, and still further objects of the present invention, are: (1) to provide an improved form of knock-down structure for supporting a roof or the like, which structure comprises a pair of pyramidal leg members designed for maximum support, and a beam member extending between the leg members and adapted to be detachably coupled therewith; (2) to provide an improved form of sectioned roof assembly wherein the sections of such assembly carry along opposite longitudinal edges thereof integral flanges adapted to cooperate in interlocking engagement with flanges on adjacent sections; and (3) to provide an improved form of frame assembly which is provided with means to support a roof between the top and bottom thereof whereby the frame assembly extends above and below the roof, supports the roof, and serves as a drain means for the roof.

As should be apparent from the foregoing objects, basically, and in its simplest aspects, the invention provides a canopy assembly including a roof portion, a frame portion, and means for supporting the frame portion and thereby the roof portion in spaced relation to the ground. The roof portion is made up of a plurality of elongated roof sections positioned side by side and joined together at their adjacent edges by cooperating flanges. The frame assembly surrounds and supports the roof, and comprises a plurality of elongated channeled members and a plurality of corner members receiving the channeled members and coupling the channeled members together to form the frame. Each of the channeled members has a side wall, and carries means for supporting the periphery of the roof portion intermediate the longitudinal edges of the side wall whereby the side walls of the channeled members and the corner members extend above and below the roof to form a facia therearound. The means for supporting the frame, and thereby the roof, in spaced relation to the ground, preferably comprises at least a pair of leg members of pyramidal shape.

The invention will be better understood, and objects other than those specifically set forth above will become apparent, when consideration is given to the following detailed description of the invention. The description refers to the illustrative embodiments of the invention presented in the annexed drawings, wherein:

FIGURE 5 is a perspective view of a preferred form of knock-down supporting understructure provided by the invention, and utilized in accordance with the teachings of the invention for supporting the roof position of the canopy;

FIGURE 6 is a fragmental exploded view showing the manner in which the parts of a given leg member of FIGURE 5 cooperate, and the manner in which the connecting member extending between the leg members of FIGURE 5 is adapted to be detachably coupled with the various parts of the leg members; and FIGURE 7 is an exploded view similar to FIGURE 6 but shows a leg member coupled together, and the manner in which the angled bracket carried thereby receives a channeled member of the frame in accordance with the invention.

Figure 1:
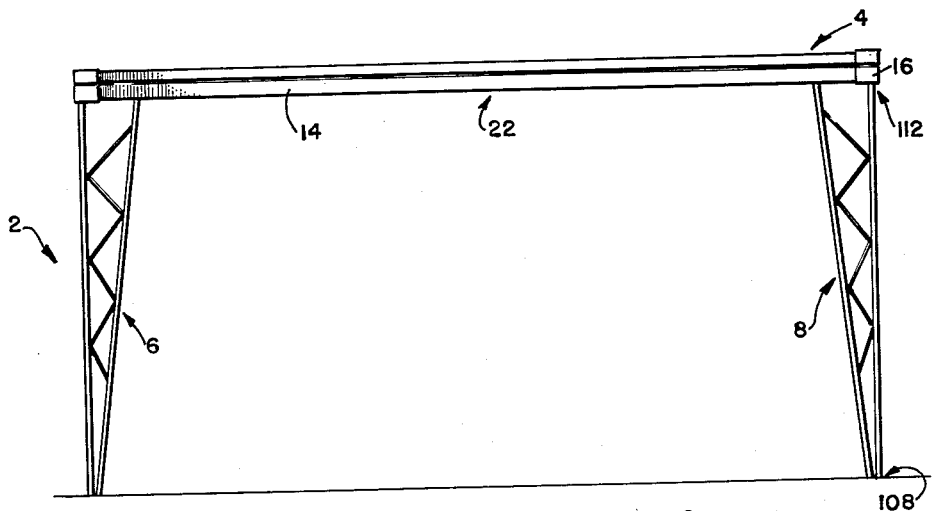
FIGURE 1 is a side view of a canopy assembly constructed in accordance with the teachings of this invention.

If particular reference is now made to FIGURE 1, it will be noted that the numeral 2 has been used to generally designate the canopy assembly provided by the invention. The numeral 4 designates the roof portion thereof, and the numerals 6 and 8 designate a pair of leg members adapted to support the roof portion 4 in spaced relation to the ground.

Figure 2:
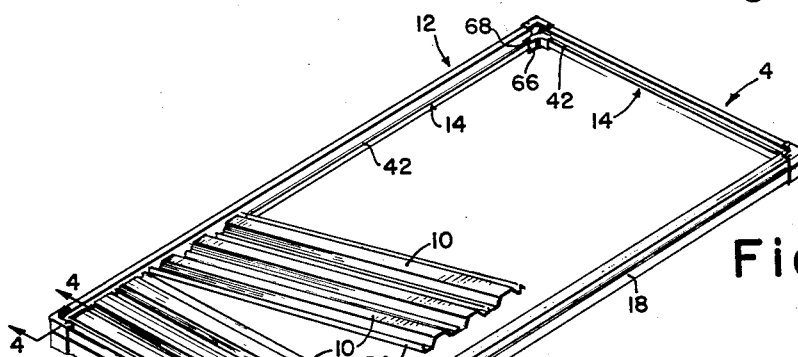
FIGURE 2 is a perspective view of a partially-assembled roof portion of the canopy shown in FIGURE 1, and presents the frame disposed about the interconnected roof sections in accordance with the preferred embodiments of the invention.

The overall, detailed construction of the roof portion of the canopy assembly designated by the numeral 4 is best shown in FIGURE 2. The roof portion includes a plurality of elongated roof sections 10 joined together at their adjacent edges by cooperating connecting means to form a roof or deck. A frame, generally designated by the numeral 12, surrounds and supports the roof in a manner described in more detail herein below. The frame comprises a plurality of elongated channeled members 14 and a plurality of corner members 16 receiving the channeled members 14 and coupling such channeled members together to form the frame 12. Each of the channeled members 14 has a side wall 18 and carries means in the form of a flange 42 for supporting the periphery of the roof sections intermediate the longitudinal edges of the side wall 18. Accordingly, the side walls of the channeled members and the corner members extend above and below the roof sections and form a facia 22 therearound as shown in FIGURE 1.

Figure 3:
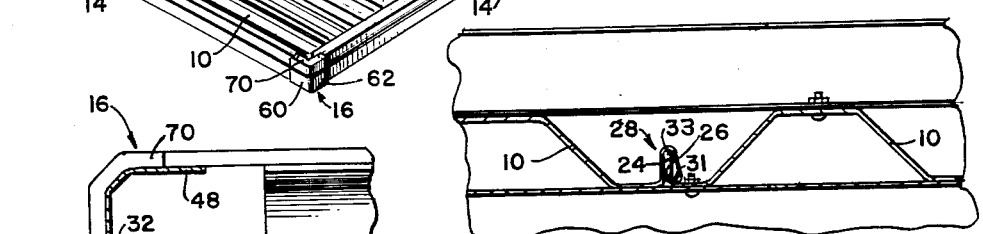
FIGURE 3 is a fragmental, detailed, cross-sectional view of portions of interconnected roof sections and an associated channeled frame member, and presents the manner in which the sections of the roof portion are coupled together, as well as the manner in which the sections of the roof portion are carried by the channeled members which make up the frame.

The elongated roof sections 10 are preferably corrugated and formed of sheet stock. Each of the sections 10, as shown in FIGURE 3, carries along one longitudinal edge thereof an upstanding flange 24 with a crimp 26 therein adjacent the base of such flange. In addition, each of the roof sections carries along the other longitudinal edge thereof an integral, upstanding flange 28. The flange 28 preferably is formed by folding the sheet stock over upon itself to provide a recess 33 opening adjacent the base of the flange 28 for receiving the upstanding flange 24 carried along the longitudinal edge of an adjacent section. The folded-over sheet stock which forms the upright flange 28 terminates in a reverse bend, and this bend provides a terminal flange 31 extending within the recess 33. The terminal flange 31 fits under and engages the crimp 26 in the upstanding flange 24 of the adjacent cooperating roof section 10 whereby the sections can be detachably coupled together along adjacent longitudinal edges.

Figures 4, 4A:
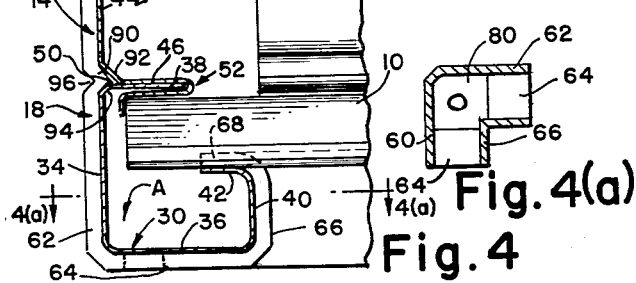
FIGURE 4 is a partial cross-sectional view of a part of the corner member, taken along the line 4—4 of FIGURE 2, and shows the manner in which the corner members receive the channeled members and the peripheral portions of the roof sections.
FIGURE 4(a) is a plan view in section of the bottom wall of a corner member taken along the line 4(a)—4(a) in FIGURE 4.

The channeled members and corner members which make up the frame 4 have detail constructions which can best understood if reference is made to FIGURE 4. Each of the channeled members 14 comprises at least two joined, elongated channeled parts 30 and 32. The channeled part 30 comprises a first upstanding wall 34 and two end walls 36 and 38 projecting inwardly from the longitudinal edges of the first upstanding wall 34. The end wall 36 carries a second upstanding wall 40 at the end thereof remote from the upstanding wall 34. The second upstanding wall 40 extends in spaced parallel relation to the first upstanding wall 34 and terminates intermediate the end walls 36 and 38. Also, the second upstanding wall 40 carries a flange 42 extending from the terminal end of wall 40 intermediate the end walls 36 and 38 toward the first upstanding wall 34.

The second channeled part 32 has an upstanding wall 44 and two end walls 46 and 48 projecting generally inwardly and perpendicularly from the longitudinal edges of the upstanding wall 44. The end wall 46 comprises sheet stock folded over upon itself to provide an elongated recess 50 opening adjacent the outer face of upstanding wall 44. The recess 50 snugly receives the end wall 38 of the first channeled part whereby the upstanding wall 34 of the part 30 and the upstanding wall 44 of the part 32 are disposed in at least substantially the same plane.

Notwithstanding the fact that I have shown and described my channeled members 14 as being made up of two channeled parts, it should be understood that the channeled members can be made deeper merely by adding another channeled part such as that designated by numeral 32 on top whereby the wall 48 cooperates with a recess in the added section, which recess is like that designated by numeral 50 in part 32. Of course, wall 48 can be shortened if desired, and the corner members 16 can be suitably extended to receive the deeper channeled members.

Although the channeled members preferably are made up of separate parts as described, such members can be considered as a unitary structure provided (a) with end walls 36 and 48 extending along the longitudinal edges of the side wall 18, and (b) with an upstanding wall 40 extending from end wall 36 in spaced parallel relation to the side wall 18. The upstanding wall 40 projects from the edge of end wall 36, and terminates intermediate the end walls 36 and 48. As explained, the flange 42 projects inwardly toward the side wall 18 from the upstanding wall 40.

As should be apparent, the end wall 46 of the channel part 32 and the end wall 38 of the channel part 30 form an additional flange 52 which extends from the side wall 18 toward the upstanding wall 40 in spaced parallel relation to the flange 42. With this construction, the peripheries of the roof sections 10 are carried between the flanges 42 and 52.

The corner members 16 which couple the channeled members 14 of the frame together each comprise a right-angle bracket. Such bracket has perpendicularly disposed side walls 60 and 62 (FIGURE 2) and a right-angle bottom wall 64 (FIGURE 4(a)) extending inwardly of the side walls of the bracket. A right-angle upstanding wall 66 extends upwardly from the edge of the bottom wall 64 remote from the side walls 60 and 62. Such upstanding wall 66 thus is disposed in spaced parallel relation to the side walls 60 and 62. Moreover, the upstanding wall 66 terminates intermediate the ends of the side walls of the bracket (FIGURE 4), and a flange 68 extends from the terminal end of the upstanding right-angle wall inwardly toward the side walls of the bracket in spaced relation to the bottom wall 64 thereof.

Accordingly, as shown in FIGURE 4, the walls and flanges of the bracket are dimensioned to snugly receive therebetween corresponding walls and flanges of the channeled members. More particularly, the side walls 60 and 62 of the bracket are sized to extend across and cover the end portions of the side walls 18 of the channeled members received by the bracket. Similarly, the right-angle bottom wall 64 of the bracket is of a size to receive the bottom wall 36 of the channeled members, and the side upstanding wall 66 of the bracket is dimensioned to receive the upstanding wall 40 of the channeled members. The inwardly-directed flange 68 of the bracket extends over the inwardly-directed flange 42 of the channeled members, and similarly a right-angle upper end wall 70 extends over the upper end walls 48 of the channeled members received by the bracket.

Preferably, each of the brackets has a projection 80 extending upwardly from the bottom wall 64 thereof as shown in FIGURE 4(a). The projection 80 is merely a raised rectangular step which serves as a stop for the ends of the bottom walls 36 of the channeled members cooperating with the right-angle bottom wall 64 of the bracket.

Although not specifically pointed out hereinabove, the channeled parts 30 and 32 which make up each of the channeled members are preferably formed of sheet stock bent to the desired shape. To facilitate the bending operations, and for purposes of appearance, the edges between adjacent walls, and adjacent walls and flanges of the channeled members, are somewhat beveled. Accordingly, the corner members or brackets 16 have an inwardly-disposed projection 90 adapted to cooperate with the recess formed by the beveled corners 92 and 94 of the channeled parts. A V-shaped recess 96 can be aligned with the projection 90 on the outer walls 60 and 62 of the corner member so that the recess formed between the channeled parts will appear continuous when the channeled parts are joined together by the corner members as shown in FIGURE 1.

Having now described the detailed construction of the preferred components which make up the roof portion of the canopy assembly provided by this invention, attention can now be directed to the means provided by the invention for supporting the roof portion in spaced relation to the ground.

As pointed out hereinabove, the means for supporting the roof comprises at least a pair of leg members 6 and 8 as shown in FIGURE 1. Each leg member of the pair comprises a pyramidal shape structure, and according to the invention the apex 108 of such structure is disposed at the bottom of the leg member and the triangular base 112 of such structure is disposed at the top of the leg member. As shown in FIGURES 5, 6 and 7, each leg member includes a pair of uprights 100 and 102 diverging with respect to one another from the bottoms thereof. A plurality of cross bars 104 extend between the pairs of uprights 100 and 102 in generally parallel relation to one another. Thus, a pair of uprights 100 and 102 and the cross bars 104 form a triangular ladder assembly 106. From the apex 108 of the ladder assembly, a third upright 110 slopes in equally spaced relation to the pair of uprights 100 and 102 and to the side of the ladder assembly 106. Thus, the upper ends of each of the uprights 100, 102 and 110 are disposed at a different corner of the triangular base 112 of the pyramidal leg member. A plurality of reinforcing rods 114 extend in zig-zag relation between the third upright 110 and the cross bars 104 of the ladder assembly for supporting and coupling the third upright 110 in spaced relation to the pair of uprights or the ladder assembly and for distributing forces exerted on the third upright. If desired, the ends of the reinforcing bars 114 adjacent the cross members 104 can carry a projecting lug 116 adapted to extend through a suitable aperture 118 in the cross members for coupling the reinforcing bars 114 and thereby the upright 110 with the ladder assembly. Of course, if desired, the ends of the reinforcing bars adjacent the cross members can be welded to the cross members. Similarly, any suitable means such as a weld can be used to couple the components of the ladder assembly together. Also, the bars 114 can be portions of a unitary bent rod if desired.

Each of the ladder assemblies 106 carries at its upper end an angled cross member or bracket 120. The bracket 120 extends between the top of upright 100 and the top of upright 102, and is secured thereto by any suitable means, such as, again, by welding. The bracket 120 preferably has a generally right-angle shape whereby it is adapted to receive a channeled member 14, or more particularly, the bottom wall 36 and upstanding wall 40 thereof, as shown in the exploded view of FIGURE 7. Additionally, the vertically-disposed plate 121 of the bracket preferably carries a flange 123 projecting inwardly thereof in spaced relation to the horizontal plate 125 of the bracket 120. The flange 123 is adapted to engage the flange 42 of a channeled member, whereby the angled bracket 120 effectively "wraps around" the lower inside portion of a channeled member received thereby.

The right-angle bracket 120 carried at the top of one leg member faces in the opposite direction from the right-angle bracket carried at the top of an opposed leg member. Specifically, the right-angle bracket 120 carried at the top of leg member 6 (FIGURE 1) would face to the left, and the right-angle bracket 120 carried at the top of leg member 8 would face to the right. Each of the right-angle brackets 120 carried by opposing leg members receives one of two channeled members extending in parallel relation to one another.

In order to maintain the tops of the leg members in spaced relation, in order to support the third upright, and in order to reinforce the overall canopy assembly, a beam member 130 extends between the leg members. Each of the right-angle roof receiving brackets or cross members 120 carries a collar 132 projecting from plate 121 thereof in the direction of the top of the third upright 110 of the particular leg member. The beam member 130 cooperates with the projection 132 to detachably connect the beam member with the cross member or bracket 120 and thereby the ladder assembly. Additionally, the beam member 130 carries coupling collars 134 spaced intermediate the ends of the beam member and adapted to cooperate with the third upright of each leg member to detachably connect that upright with the beam member 130.

According to the preferred embodiments of the invention, the beam member 130 is a hollow, rectangular member and the collar 132 is dimensioned to receive the beam member therein. Similarly, the collar 134 is preferably rectangular and the upright 110 is rectangular and hollow whereby the upright member 110 is received within the collar 134. Of course, if desired, the collars can be dimensioned to fit within the ends of the beam members, as opposed to being dimensioned to receive the ends of the beam members within the collar. Aligned apertures are provided in the collars and on the beam member 130 as well as the upright 110, and through such apertures pass a suitable locking device, such as a bolt.

From the foregoing description, it should be apparent that the canopy assembly can be shipped and/or stored in knock-down form and subsequently assembled by a person without special skill, or without special tools. The roof sections 10 can be easily interlocked as described, and the frame 4 can be assembled by coupling the channeled members 14 with the corner members as described. Similarly, the third upright and zig-zag reinforcing bars can be coupled with the ladder assembly, and the beam can be attached to the cross member 120 and the third upright of each leg member to form the finished means for supporting the roof portion of the assembly in spaced relation to the ground.

After the canopy has been assembled, or while the various portions of the canopy are being assembled, the roof sections 10 can be bolted to the channeled members, or more particularly, the flanges of the channeled members between which the peripheries of the roof sections are disposed. Specific reference is made to FIGURE 3 wherein the sections 10 are shown as bolted between the flanges 42 and 52 of the channeled members.

In order to make my overall canopy assembly as light as possible, I preferably form all the components thereof from aluminum. The channeled members and roof sections can be formed from the sheet stock, or extruded, the corner members can be easily cast, and the rods and bars which make up the pyramidal leg members also can be extruded or formed from sheet stock.

The particular manner of fabricating the various individual components, and the materials used, form no part of the invention, and are expalined only so that it will be clear that the assembly can be easily and inexpensively manufactured.

In constructing the canopy provided by the invention, preferably one edge thereof extending perpendicular to the longitudinal edges of the roof sections is disposed somewhat lower than the other edge so disposed. In other words, I make one side of the canopy slightly lower than the other side of the canopy so that precipitation which falls on the roof will be readily drained therefrom. The lowering of one edge can be accomplished by sinking the leg members disposed on one side of the roof portion into the ground slightly more than the leg members disposed on the other side of the roof portion, or if leg members are only used on one side of the roof portion, or at one end thereof, then all the leg members can be sunk into the ground to provide the desired slope of the roof portion.

Precipitation which has fallen on the roof and which is draining therefrom flows along the valleys in the corrugated roof sections, and into the channeled member extending along the lowered side of the canopy. As shown in FIGURE 4, liquid which would drain from the roof section 10 would fall therefrom in the direction of arrow A and into the channeled member. Liquid which has followed this path would flow along the channeled member to the point where an aperture was provided in the bottom thereof. Preferably, such apertures are provided in the corner members so that the drain from the canopy is localized at the corners. If desired, a suitable rainspout or the like can be coupled with the corner members to drain the precipitation to a desired location on the ground.

From the foregoing description of the preferred embodiments of the invention presented in the drawings, it should be apparent that the objects set forth at the outset of this specification have been successfully achieved.

Accordingly, what is claimed is:

1. A canopy assembly comprising a plurality of elongated roof sections positioned side by side and locked together at their adjacent edges by cooperating connecting means carried thereby to form a roof; a frame surrounding and supporting said roof, said frame comprising a plurality of elongated channeled members and a plurality of channel-type corner members receiving said channeled members and coupling said channeled members together to form said frame with said corner members forming the outer corner portions thereof; each of said channeled members having a side wall, spaced apart end walls projecting inwardly from said side wall, and upstanding wall extending in spaced parallel relation to said side wall and projecting from the edge of one of said end walls remote from side wall, said upstanding wall terminating intermediate said end walls of said channeled member and carrying at the terminal end thereof a first flange extending inwardly toward said side wall, and a second flange extending from said side wall toward said upstanding wall in spaced parallel relation to said first flange; said first and second flanges forming means for supporting respectively the bottom and top surfaces of the periphery of said roof intermediate the longitudinal edges of said side wall, whereby the side walls of said channeled members and said corner members extend along and below said roof and form a facia therearound, at least two of said channeled members extending in spaced parallel relation to each other; and wherein said assembly further includes opposed supporting leg members, each leg member comprising a triangular pyramidal assembly with the apex thereof disposed at the bottom of said leg member, and carrying between two corners of the base of the pyramidal assembly an angle bracket, said angle bracket having a base wall, an upstanding wall extending from one side of said base wall and a flange projecting from said upstanding wall in overlying parallel relation to said base wall, said base wall, upstanding wall and flange of said bracket engaging respectively said one of said end walls, said upstanding wall and said first flange of said channel member, said angle bracket having a coupling collar projecting from the upstanding wall thereof toward the other corner of the base of the pyramidal assembly, and a beam extending between said opposed leg members, said beam being coupled at either end to said coupling collars, said beam carrying further coupling collars depending therefrom and coupling said other corner of the base of each of said pyramidal assemblies to said beam.

2. A canopy assembly as defined in claim 1 wherein said leg members each comprise a pair of uprights diverging from the bottoms thereof, a plurality of cross bars extending between said pair of uprights in parallel relation to each other whereby said uprights and cross bars form a triangular ladder assembly with the apex thereof disposed at the base of the leg member, a third upright sloping, in equally spaced relation to said pair of uprights, from the apex of said ladder assembly to one side thereof, and a plurality of reinforcing rods extending in zig-zag relation between said third upright and said cross bars of said ladder assembly, said reinforcing rods carrying projecting coupling lugs extending from the apices of the zig-zags remote from said third upright, said cross-bars having apertures therein for receiving said lugs.

3. A canopy assembly as defined in claim 1 wherein said elongated roof sections are corrugated, and wherein said cooperating connecting means comprise a first upstanding flange extending along one longitudinal edge of each of said roof sections, said first flange having a crimp therein adjacent said edge, and a second upstanding flange extending along the other longitudinal edge of each of said roof sections, said second flange comprising sheet stock folded over upon itself to provide a recess for receiving the first upstanding flange of an adjacent section, said sheet stock terminating in a reverse bend to provide a terminal flange extending within said recess to fit under and engage the crimp in the first flange of an adjacent section.

4. A canopy assembly comprising a plurality of elongated roof sections positioned side by side and locked together at their adjacent edges by cooperating connecting means carried thereby to form a roof; a frame surrounding and supporting said roof, said frame comprising a plurality of elongated channeled members and a plurality of channel-type corner members receiving said channeled members and coupling said channeled members together to form said frame with said corner members forming the outer corner portions thereof; each of said channeled members comprising at least two joined elongated channel parts, one of said parts comprising a first upstanding side wall and two end walls projecting perpendicularly inwardly from the longitudinal edges of said first upstanding wall, one of said end walls carrying a second upstanding wall at the end thereof remote from said first upstanding wall, said second upstanding wall extending in spaced parallel relation to said first upstanding wall and terminating intermediate said end walls, said second upstanding wall carrying a flange extending from the terminal end thereof intermediate said end walls toward said first upstanding wall; and wherein the other of said parts comprises an upstanding wall and two end walls projecting perpendicularly from the longitudinal edges thereof, one of said last-mentioned end walls comprising sheet stock folded over upon itself to provide an enlongated recess opening adjacent said last-mentioned upstanding wall and snugly receiving the other of said end walls of said one part in a flange joint whereby said upstanding wall of said one part and upstanding wall of said other part are disposed in at least substantially the same plane, said flange and said flange joint forming means for supporting respectively the bottom and top surfaces of the periphery of said roof intermediate the longitudinal edges of said side wall, whereby the side walls of said channeled members and said corner members extend along and below said roof and form a facia therearound.

References Cited in the file of this patent

UNITED STATES PATENTS

| 970,885 | Clemmer | Sept. 20, 1910 |
| 2,037,736 | Payne et al. | Apr. 21, 1936 |
| 2,272,910 | Gobberdiel | Feb. 10, 1942 |
| 2,668,509 | Fox-Williams | Feb. 9, 1954 |
| 2,762,089 | Auble | Sept. 11, 1956 |
| 2,811,935 | Jones | Nov. 5, 1957 |
| 2,824,341 | Ashton et al. | Feb. 25, 1958 |
| 2,873,698 | Hartman et al. | Feb. 17, 1959 |

FOREIGN PATENTS

| 1,122,122 | France | of 1956 |